(12) United States Patent
Kaneda et al.

(10) Patent No.: US 11,505,460 B2
(45) Date of Patent: Nov. 22, 2022

(54) METHOD FOR PRODUCING SILANOL COMPOUND AND HYDROGEN

(71) Applicants: OSAKA UNIVERSITY, Suita (JP); DAICEL CORPORATION, Osaka (JP)

(72) Inventors: Kiyotomi Kaneda, Suita (JP); Takato Mitsudome, Suita (JP); Yasuteru Kajikawa, Himeji (JP); Yuuichirou Hirai, Himeji (JP); Keisuke Ono, Himeji (JP)

(73) Assignees: OSAKA UNIVERISTY, Suita (JP); DAICEL CORPORATION, Osaka (JP)

( * ) Notice: Subject to any disclaimer, the term of this patent is extended or adjusted under 35 U.S.C. 154(b) by 659 days.

(21) Appl. No.: 16/345,199

(22) PCT Filed: Sep. 8, 2017

(86) PCT No.: PCT/JP2017/033373
§ 371 (c)(1),
(2) Date: Apr. 25, 2019

(87) PCT Pub. No.: WO2018/211720
PCT Pub. Date: Nov. 22, 2018

(65) Prior Publication Data
US 2019/0276309 A1    Sep. 12, 2019

(30) Foreign Application Priority Data
May 15, 2017 (JP) .............................. JP2017-096381

(51) Int. Cl.
| | |
|---|---|
| *C01B 3/32* | (2006.01) |
| *B01J 23/52* | (2006.01) |
| *B01J 27/18* | (2006.01) |
| *C07F 7/08* | (2006.01) |
| *H01M 8/0612* | (2016.01) |
| *H01M 8/0606* | (2016.01) |
| *C07B 61/00* | (2006.01) |
| *C01B 3/02* | (2006.01) |

(52) U.S. Cl.
CPC .............. *C01B 3/326* (2013.01); *B01J 23/52* (2013.01); *B01J 27/18* (2013.01); *B01J 27/1806* (2013.01); *C01B 3/02* (2013.01); *C01B 3/32* (2013.01); *C07B 61/00* (2013.01); *C07F 7/0801* (2013.01); *C07F 7/0836* (2013.01); *C07F 7/0896* (2013.01); *H01M 8/0606* (2013.01); *H01M 8/0618* (2013.01); *C01B 2203/02* (2013.01); *C01B 2203/066* (2013.01); *C01B 2203/1082* (2013.01)

(58) Field of Classification Search
CPC .................. C01B 3/326; B01J 23/52
USPC ....................................... 423/648.1
See application file for complete search history.

(56) References Cited

U.S. PATENT DOCUMENTS

2010/0255392 A1*  10/2010  Spear ..................... B01J 8/009
                                                          429/421

FOREIGN PATENT DOCUMENTS

| CN | 104707651 A | 6/2015 |
|---|---|---|
| JP | 2017-24958 A | 2/2017 |

OTHER PUBLICATIONS

Supported gold nanoparticle catalyst for the selective oxidation of silanes to silanols in water Takato Mitsudome et al Chem. Commun. pp. 5302-5304 (Year: 2009).*
Nanostructured Materials as Catalysts: Nanoporous-Gold-Catalyzed Oxidation of Organosilanes with water. Naoki Asao et al. Angew. Chem. Int. Ed. V 49, pp. 10093-10095 (Year: 2010).*
Synthesis of sub-nanometer gold particles on modified Silica A. Beloqui Redondo et al. Dalton Trans. V 45, pp. 2983-2988 (Year: 2016).*
Office Action dated Sep. 15, 2020, in Taiwan Patent Application No. 106131217.
Urayama et al., "$O_2$-enhanced Catalytic Activity of Gold Nanoparticles in Selective Oxidation of Hydrosilanes to Silanols," Chem. Lett. (May 2015), vol. 44, No. 8, pp. 1062-1064.
English translation of International Preliminary Report on Patentability and Written Opinion dated Nov. 28, 2019, in PCT/JP2017/033373 (Forms PCT/IB/338, PCT/IB/373, and PCT/ISA/237).
International Search Report dated Oct. 10, 2017, in PCT/JP2017/033373.

(Continued)

*Primary Examiner* — Douglas B Call
(74) *Attorney, Agent, or Firm* — Birch, Stewart, Kolasch & Birch, LLP

(57) ABSTRACT

Provided is a method for generating hydrogen at a desired rate, using a hydrogen storage material that can be stored and transported safely and inexpensively. The method according to the present invention for producing a silanol compound and hydrogen includes subjecting a hydrosilane compound and water to a reaction with each other in the presence of a solid catalyst to give a silanol compound and hydrogen. The solid catalyst includes hydroxyapatite and gold particles supported on the hydroxyapatite, where the gold particles have an average particle size of 2.5 nm or less. The reaction in the method according to the present invention for producing a silanol compound and hydrogen is preferably performed in an air atmosphere. The reaction in the method according to the present invention for producing a silanol compound and hydrogen can be performed with application of substantially no heat and no activated energy rays.

15 Claims, 1 Drawing Sheet

(56) References Cited

OTHER PUBLICATIONS

Mitsudome et al., "On-demand Hydrogen Production from Organosilanes at Ambient Temperature Using Heterogeneous Gold Catalysts," Scientific Reports (2016), vol. 6, No. 37682, pp. 1-5.
Written Opinion of the International Searching Authority mailed Oct. 10, 2017, in PCT/JP2017/033373.

* cited by examiner

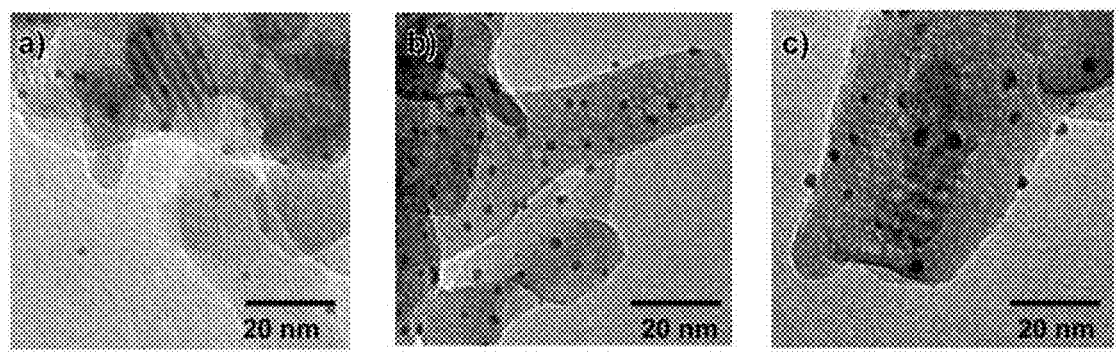

METHOD FOR PRODUCING SILANOL COMPOUND AND HYDROGEN

CROSS-REFERENCE TO RELATED APPLICATIONS

This application is the National Phase of PCT International Application No. PCT/JP2017/033373, filed on Sep. 8, 2017, which claims priority under 35 U.S.C. § 119(a) to Patent Application No. 2017-096381, filed in Japan on May 15, 2017, all of which are hereby expressly incorporated by reference into the present application.

TECHNICAL FIELD

The present invention relates to a method of reacting a hydrosilane compound with water under mild conditions to yield a silanol compound and hydrogen. The hydrogen resulting from the method is useful as a clean energy resource.

BACKGROUND ART

Hydrogen, even if burnt, does not evolve carbon dioxide and therefore receives attention as a next-generation energy. Disadvantageously, however, hydrogen is hard to store and transport, because hydrogen is gaseous at room temperature and normal atmospheric pressure, is thereby bulky, and, in addition, is to be in danger of explosion due to high reactivity. It is possible to reduce the volume (bulk) of hydrogen by liquefaction before transportation. Disadvantageously, however, the hydrogen liquefaction requires cooling down to −253° C. and takes lots of energy. It is also possible to reduce the volume of hydrogen by compression, but, also disadvantageously, the hydrogen compression requires energy and increases the risk of explosion.

As a possible solution to these disadvantages (problems), there have been increasingly developed hydrogen storage materials, which are materials that store and release hydrogen. Known examples of the hydrogen storage materials include formic acid; and metal hydrides such as calcium hydride and lithium aluminum hydride (PTL 1). Disadvantageously, however, such metal hydrides are unstable and are difficult to store. In addition, the metal hydrides vigorously react with water to generate hydrogen, and this disadvantageously impedes the control of hydrogen generation rate. Also disadvantageously, the recovery of hydrogen from formic acid requires heating, by-produces carbon dioxide and carbon monoxide, and requires a process for separating hydrogen from these by-products.

CITATION LIST

Patent Literature

PTL 1: Japanese Unexamined Patent Application Publication (JP-A) No. 2017-24958

SUMMARY OF INVENTION

Technical Problem

Accordingly, the present invention has an object to provide a method capable of generating hydrogen at a desired rate, using a hydrogen storage material that can be stored and transported safely and inexpensively.

The present invention has another object to provide a method for producing, in addition to hydrogen, a silanol compound, which is useful for silicon resins and in coupling reactions.

The present invention has still another object to provide a hydrogen generator and a fuel cell, each of which utilizes the hydrogen generation method.

Solution to Problem

After intensive investigations to achieve the objects, the inventors of the present invention found that a hydrosilane compound, which is an inexpensive and safe compound, is useful as a hydrogen storage material; the use of a solid catalyst including hydroxyapatite and gold particles supported thereon having an average particle size of 2.5 nm or less enables efficient production of hydrogen and a silanol compound from such a hydrosilane compound and water, which are reaction substrates, under mild conditions; and that control of the contact/noncontact between the solid catalyst and the reaction substrates enables easy control of the generation rate of hydrogen and the silanol compound. The present invention has been made on the basis of these findings.

Specifically, the present invention provides a method for producing a silanol compound and hydrogen. The method includes subjecting a hydrosilane compound and water to a reaction with each other in the presence of a solid catalyst to give a silanol compound and hydrogen. The solid catalyst includes hydroxyapatite and gold particles supported on the hydroxyapatite, where the gold particles have an average particle size of 2.5 nm or less.

In the method for producing a silanol compound and hydrogen, the reaction may be performed in an air atmosphere.

In the method for producing a silanol compound and hydrogen, the reaction may be performed with application of substantially no heat and no activated energy rays.

In the method for producing a silanol compound and hydrogen, the hydrosilane compound may be a compound represented by Formula (1):

[Chem. 1]

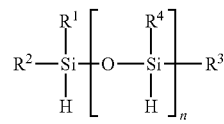

(1)

wherein $R^1$ to $R^4$ are each, identically or differently, selected from hydrogen, an optionally substituted hydrocarbon group, and a $-Si(R^5)_3$ group, where $R^5$ is, identically or differently in each occurrence, selected from hydrogen and a hydrocarbon group; and n represents an integer of 0 or more, where, when n is an integer of 2 or more, two or more occurrences of $R^4$ may be identical or different.

The present invention also provides a hydrogen generator including a system that generates hydrogen using the method for producing a silanol compound and hydrogen.

The hydrogen generator may have an ON/OFF switching function of making contact between the solid catalyst and the reaction substrates to induce hydrogen generation, and of interrupting the contact between the solid catalyst and the reaction substrates to impede the hydrogen generation.

The present invention also provides a fuel cell including the hydrogen generator.

Advantageous Effects of Invention

A hydrosilane compound is a compound which is contained also in industrial waste and is available inexpensively and stably. In addition, the hydrosilane compound is highly safe and stable, is easy to store and to transport, and resists deterioration with time. With the present invention, by using the hydrosilane compound as a hydrogen storage material, hydrogen and a silanol compound can be produced efficiently under mild conditions without the need for external energy. The hydrogen can be easily separated and recovered from reaction products. In addition, the progress rate and ON/OFF of the reaction can be adjusted or controlled by switching the contact state (for example, contact or noncontact) between the solid catalyst and the reaction substrates, and hydrogen and a silanol compound can be produced only in the quantity needed, only when needed.

The hydrogen generator using the present invention having the properties satisfactorily resists deterioration and can be stored for a long time, as compared with conventional cells and batteries. The hydrogen generator is therefore usable as a portable power source for use in emergency such as disasters. In addition, the hydrogen generator is affordable to reduction in size and weight and is thereby applicable to fuel cells (such as pocket-size fuel cells for use typically in charging of smartphones).

The hydrogen obtained by the present invention is useful as a fuel for fuel cells and can give electric power by burning the hydrogen in the air. The hydrogen, even when being burnt, by-produces water alone, but by-produces no carbon dioxide, and is a clean energy, since the carbon dioxide is considered as one of causes of global warming. The present invention therefore significantly contribute to the realization of a low-carbon society that puts a smaller load on global environment.

BRIEF DESCRIPTION OF DRAWINGS

FIGS. 1(a), 1(b), and 1(c) are TEM photomicrographs of solid catalysts resulting respectively from Preparation Example 1, Preparation Example 2, and Preparation Example 3.

DESCRIPTION OF EMBODIMENTS

Method for Producing Silanol Compound and Hydrogen

The method according to the present invention for producing a silanol compound and hydrogen includes subjecting a hydrosilane compound and water to a reaction with each other in the presence of a solid catalyst to give a silanol compound and hydrogen. The solid catalyst includes hydroxyapatite and gold particles supported on the hydroxyapatite, where the gold particles have an average particle size of 2.5 nm or less.

Solid Catalyst

The solid catalyst for use in the present invention includes hydroxyapatite and gold particles, where the gold particles have an average particle size of 2.5 nm or less and are supported on the hydroxyapatite.

The solid catalyst has an average particle size of typically 0.1 to 50 μm, preferably 0.1 to 20 μm, and particularly preferably 0.1 to 0.5 μm, as determined by direct observation using a transmission electron microscope (TEM). The solid catalyst has a standard deviation (σ) in particle size distribution of typically 0.05 to 0.5, and preferably 0.1 to 0.3.

The gold particles to be supported on the hydroxyapatite have an average particle size (average particle diameter) of 2.5 nm or less, and preferably 2.0 nm or less, where the lower limit of the average particle size is typically 1.5 nm. The average particle size of the gold particles for use in the present invention is measured by direct observation using a transmission electron microscope (TEM). The average particle size of the gold particles significantly affects the catalytic activity of the solid catalyst and, if being greater than the range, disadvantageously causes abrupt reduction in catalytic activity.

The hydroxyapatite has a specific surface area of typically 10 to 1000 m²/g, preferably 50 to 800 m²/g, particularly preferably 100 to 700 m²/g, especially preferably 100 to 500 m²/g, and most preferably 100 to 300 m²/g, as determined by the BET method.

The hydroxyapatite has an average particle size of typically 0.1 to 50 μm, preferably 0.1 to 20 μm, and particularly preferably 0.1 to 0.5 μm, as determined by direct observation using a transmission electron microscope (TEM). The hydroxyapatite has a standard deviation (σ) in particle size distribution of typically 0.05 to 0.5, and preferably 0.1 to 0.3.

The gold particles to be supported on the hydroxyapatite are not limited in their form, and non-limiting examples of the form include elemental gold, gold salts, gold oxides, gold hydroxides, and gold complexes. Among them, elemental gold is preferred in the present invention, because of having particularly excellent catalytic activity.

The solid catalyst for use in the present invention includes gold particles being supported and having a very small average particle size as described above. Accordingly, even if the gold particles are supported in a small amount, the solid catalyst can offer catalytic effects equivalent to or higher than those in the case using gold particles having a large average particle size (for example, in the case using gold particles having an average particle size of 3 nm or more). Thus, the gold particles are supported in an amount (in terms of metal) of typically about 0.05 to about 10 weight percent, preferably 0.1 to 5.0 weight percent, more preferably 0.1 to 3.0 weight percent, particularly preferably 0.1 weight percent to less than 2.0 weight percent, especially preferably 0.1 to 1.5 weight percent, and most preferably 0.1 to 1.0 weight percent, relative to the hydroxyapatite.

The hydroxyapatite is typically a compound represented by Formula (2):

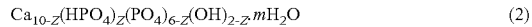

$$Ca_{10-Z}(HPO_4)_Z(PO_4)_{6-Z}(OH)_{2-Z} \cdot mH_2O \quad (2)$$

wherein Z represents a number meeting the condition: 0≤Z≤1; and m represents a number of 0 to 2.5.

The hydroxyapatite can be prepared typically by a wet synthesis method. The wet synthesis method is a method in which a calcium solution and a phosphoric acid solution are added dropwise to a buffer having a pH of 7.4 or more over a long time, to precipitate hydroxyapatite in the buffer, and the precipitated hydroxyapatite is collected, where the two solutions are added so that the ratio (mole ratio) of the calcium solution to the phosphoric acid solution be 10:6.

The hydroxyapatite for use herein may also be selected from commercial products such as Tricalcium Phosphate (trade name, supplied by Wako Pure Chemical Industries, Ltd.).

A non-limiting example of the way to allow the hydroxyapatite to support gold particles (preferably, elemental gold) thereon is a method by which a solution of a gold compound is combined with a reducing agent to precipitate elemental gold, and the hydroxyapatite is allowed to adsorb the precipitated elemental gold. Non-limiting examples of the gold compound usable herein include gold halides such as $HAuCl_4$ and other gold chlorides, gold bromides, and gold iodides; gold salts such as carbonates, nitrates, sulfates, and phosphates; and gold complexes.

The solvent contained in the gold compound solution is not limited, as long as having dissolving power on the gold compound, and non-limiting examples of such solvents include water; ketones such as acetone; and alcohols such as methanol. The concentration of the gold compound in the solution is not limited and can be selected as appropriate within the range of typically 0.1 to 1000 mM.

The gold compound solution for use in the present invention preferably further contains a capping agent so as to restrain the precipitated elemental gold from aggregating and to control the size of gold particles. As the capping agent to be added, glutathione is preferably used. The capping agent may be added in an amount of typically about 1 to about 10 moles per mole of the gold compound.

Non-limiting examples of the reducing agent for the gold compound include borohydride complex compounds such as sodium borohydride ($NaBH_4$), lithium borohydride ($LiBH_4$), and potassium borohydride ($KBH_4$); hydrazine; hydrogen ($H_2$); silane compounds such as trimethylsilane; and hydroxy compounds. The hydroxy compounds include alcohol compounds such as primary alcohols and secondary alcohols. The hydroxy compounds may each be any of monohydric alcohols, dihydric alcohols, and polyhydric alcohols.

A non-limiting example of the way to allow the hydroxyapatite to adsorb the elemental gold precipitated by the addition of the reducing agent, is a method of adding the hydroxyapatite to the solution (fluid) containing the elemental gold and stirring the resulting mixture.

The stirring may be performed at a temperature as selectable within the range of typically 20° C. to 150° C., but is preferably performed at room temperature. The stirring may be performed for a time of typically about 0.5 to about 10 hours, while the stirring time may vary depending on the temperature.

The average particle size of the gold particles to be supported on the solid catalyst can be controlled typically by adjusting the amount of the hydroxyapatite to be added. For example, the amount of the hydroxyapatite to be added is preferably 7 g or more (for example 7 to 50 g, preferably 10 to 50 g, and particularly preferably 10 to 45 g) per millimole of the gold compound.

After the adsorption by the hydroxyapatite, the precipitates are washed typically with water and/or an organic solvent as needed and separated by a physical separation means such as filtration or centrifugal separation. The separated precipitates are dried and further fired, and yield the solid catalyst for use in the present invention.

Hydrosilane Compound

The hydrosilane compound for use in the present invention is a compound containing one or more silicon-hydrogen bonds in a molecule and is exemplified typically by a compound represented by Formula (1):

[Chem. 2]

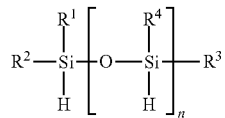

wherein $R^1$ to $R^4$ are each, identically or differently, selected from hydrogen, an optionally substituted hydrocarbon group, and a $-Si(R^5)_3$ group, where $R^5$ is, identically or differently in each occurrence, selected from hydrogen and a hydrocarbon group; and n represents an integer of 0 or more, where, when n is an integer of 2 or more, two or more occurrences of $R^4$ may be identical or different.

The category hydrocarbon group as $R^1$ to $R^5$ includes aliphatic hydrocarbon groups, alicyclic hydrocarbon groups, aromatic hydrocarbon groups, and groups each including two or more of them bonded to each other.

Of the aliphatic hydrocarbon groups, preferred are aliphatic hydrocarbon groups containing 1 to 20 carbon atoms, which are exemplified typically by alkyls containing 1 to about 20 carbon atoms, such as methyl, ethyl, propyl, isopropyl, butyl, isobutyl, s-butyl, t-butyl, pentyl, hexyl, decyl, and dodecyl, of which those containing 1 to about 10 carbon atoms are preferred, and those containing 1 to about 3 carbon atoms are particularly preferred; alkenyls containing 2 to about 20 carbon atoms, such as vinyl, allyl, and 1-butenyl, of which those containing 2 to about 10 carbon atoms are preferred, and those containing 2 to about 3 carbon atoms are particularly preferred; and alkynyls containing 2 to about 20 carbon atoms, such as ethynyl and propynyl, of which those containing 2 to about 10 carbon atoms are preferred, and those containing 2 to about 3 carbon atoms are particularly preferred.

Of the alicyclic hydrocarbon groups, preferred are $C_3$-$C_{20}$ alicyclic hydrocarbon groups, which are exemplified typically by cycloalkyls containing 3 to about 20 members, such as cyclopropyl, cyclobutyl, cyclopentyl, cyclohexyl, and cyclooctyl, of which those containing 3 to about 15 members are preferred, and those containing about 5 to about 8 members are particularly preferred; cycloalkenyls containing 3 to about 20 members, such as cyclopentenyl and cyclohexenyl, of which those containing 3 to about 15 members are preferred, and those containing about 5 to about 8 members are particularly preferred; and bridged hydrocarbon groups such as perhydronaphth-1-yl, norbornyl, adamantyl, tricyclo[5.2.1.0$^{2,6}$]dec-8-yl, and tetracyclo [4.4.0.1$^{2,5}$.1$^{7,10}$]dodec-3-yl.

Of the aromatic hydrocarbon groups, preferred are $C_6$-$C_{14}$ aromatic hydrocarbon groups such as phenyl and naphthyl, of which $C_6$-$C_{10}$ aromatic hydrocarbon groups are particularly preferred.

Non-limiting examples of the hydrocarbon groups including an aliphatic hydrocarbon group and an alicyclic hydrocarbon group bonded to each other include cycloalkyl-substituted alkyls exemplified by $C_3$-$C_{20}$ cycloalkyl-substituted $C_1$-$C_4$ alkyls, such as cyclopentylmethyl, cyclohexylmethyl and 2-cyclohexylethyl. Non-limiting examples of the hydrocarbon groups including an aliphatic hydrocarbon group and an aromatic hydrocarbon group bonded to each other include aralkyls exemplified by $C_7$-$C_{18}$ aralkyls such as benzyl; and alkyl-substituted aryls exemplified by phenyl or naphthyl each substituted with one to about four $C_1$-$C_4$ alkyls.

Non-limiting examples of substituents which the hydrocarbon group as $R^1$ to $R^4$ may have include halogens, substituted oxys such as $C_1$-$C_5$ alkoxys, $C_6$-$C_{10}$ aryloxys, $C_7$-$C_{11}$ aralkyloxys, and $C_1$-$C_5$ acyloxys; and —Si($R^5$)$_3$ groups, where $R^5$ is, identically or differently in each occurrence, selected from hydrogen and a hydrocarbon group.

Non-limiting examples of the hydrosilane compound include tetramethyldisiloxane, polymethylhydrosiloxane, triethylsilane, dimethyl-t-butylsilane, tributylsilane, trihexylsilane, triisobutylsilane, triisopropylsilane, tri(n-propyl) silane, dimethylvinylsilane, dimethylcyclohexylsilane, dimethylbenzylsilane, dimethylphenylsilane, methyldiphenylsilane, triphenylsilane, diphenyldisilane, 1,4-bis(dimethylsilyl)benzene, 4-dimethylsilyltoluene, 1-methoxy-4-dimethylsilylbenzene, and 1-chloro-4-dimethylsilylbenzene. Each of them may be used alone or in combination.

For example, dimethylphenylsilane or another hydrosilane compound containing an aromatic hydrocarbon group as at least one of hydrocarbon groups bonded to Si (such as a compound of Formula (1) in which at least one of $R^1$ to $R^4$ is an aromatic hydrocarbon group) may be used as the substrate. In this case, a solid catalyst including hydroxyapatite and gold particles supported thereon having an average gold particle size of greater than 3 nm, if used, fails to allow the reaction to proceed efficiently and gives a silanol compound in a yield of less than 40%. In contrast, the present invention employs the solid catalyst including hydroxyapatite and gold particles supported thereon having an average gold particle size of 2.5 nm or less, thereby allows the reaction to proceed efficiently even when the compound is used as the substrate, and can produce hydrogen and a corresponding silanol compound efficiently.

Method for Producing Silanol Compound and Hydrogen

The method according to the present invention for producing a silanol compound and hydrogen includes subjecting a hydrosilane compound and water to a reaction with each other in the presence of the solid catalyst to give a silanol compound and hydrogen (preferably, subjecting a hydrosilane compound and water to an oxidation reaction to give a silanol compound and hydrogen).

The solid catalyst is used in an amount (in terms of gold contained in the solid catalyst) of typically about 0.001 to about 10 mole percent relative to the hydrosilane compound. The upper limit of the amount is preferably 5 mole percent, more preferably 2.5 mole percent, particularly preferably 1 mole percent, especially preferably 0.5 mole percent, and most preferably 0.1 mole percent. The lower limit of the amount is preferably 0.005 mole percent, and particularly preferably 0.01 mole percent.

Water acts as an oxidizer for the hydrosilane compound in the present invention. The water may be used in an amount of typically 0.05 mL or more, preferably 0.05 to 5 mL, more preferably 0.05 to 1 mL, and particularly preferably 0.1 to 0.5 mL, per millimole of the hydrosilane compound.

The reaction atmosphere is not limited, as long as not adversely affecting the reaction, and is exemplified typically by air atmosphere, oxygen atmosphere, nitrogen atmosphere, and argon atmosphere. In the present invention, air atmosphere or oxygen atmosphere is preferred among them, for offering effectively increased catalytic activity, and, air atmosphere is particularly preferred for excellent safety.

The reaction is preferably performed in the presence of a solvent. The solvent for use herein is preferably selected from solvents having compatibility (miscibility) with water. Non-limiting examples of such solvents include alcohol solvents such as methanol, ethanol, 2-propanol, and 1-butanol; ether solvents such as dimethyl ether, diethyl ether, diisopropyl ether, dibutyl ether, tetrahydrofuran, dioxane, 1,2-dimethoxyethane, and cyclopentyl methyl ether; ketone solvents such as acetone and ethyl methyl ketone; and ester solvents such as ethyl acetate and butyl acetate. Each of them may be used alone or in combination.

The solvent is preferably used in such an amount that the initial concentration of the substrate be typically 10 to 0.1 mol/L when the reaction is performed in a batch system.

The reaction proceeds approximately without application of at least one of heat and actinic radiation (substantially without heating and substantially without application of activated energy rays).

The reaction may be performed at a temperature of typically, but not limited thereto, about 0° C. to about 100° C. With the present invention, which employs the solid catalyst having very excellent catalytic activity, allows the reaction to proceed efficiently even at room temperature (for example, 1° C. to 30° C.) and to thereby produce hydrogen and a silanol compound in good yields.

The reaction time of the reaction can be adjusted as appropriate depending on the reaction temperature. For example, when the reaction is performed at room temperature, the reaction time is typically about 1 to about 360 minutes, preferably 1 to 60 minutes, particularly preferably 1 to 30 minutes, and most preferably 1 to 10 minutes.

The reaction may be performed in any of liquid phases and aqueous phases. In the present invention, the reaction is preferably performed in an aqueous phase (namely, as a liquid phase reaction, more preferably as a liquid phase oxidation reaction), for performing the reaction under more mild conditions.

The reaction can be performed in any system such as batch system, semi-batch system, or continuous system.

After the completion of the reaction, the reaction products can be separated and purified by a separation means such as filtration, concentration, distillation, extraction, crystallization, recrystallization, or column chromatography, or a separation means as any combination of them.

With the method according to the present invention for producing a silanol compound and hydrogen, a hydrosilane compound can be converted efficiently to produce a silanol compound and hydrogen in high yields. The silanol compound may be produced in a yield of typically 40% or more, preferably 45% or more, more preferably 50% or more, furthermore preferably 60% or more, particularly preferably 80% or more, and most preferably 95% or more.

After the completion of the reaction, the solid catalyst for use in the present invention can be easily separated and recovered from the reaction products by a physical separation means such as filtration and/or centrifugal separation, and the separated/recovered solid catalyst can be reused with no treatment or after a treatment such as washing and/or drying. Accordingly, the solid catalyst, which is expensive, can be used repeatedly, and this provides economical efficiency.

Hydrogen Generator

The hydrogen generator according to the present invention includes a system to generate hydrogen using the method for producing a silanol compound and hydrogen. More specifically, the hydrogen generator includes a system in which hydrogen is generated by subjecting a hydrosilane compound and water to a reaction with each other in the presence of a solid catalyst including hydroxyapatite and gold particles supported thereon having an average gold particle size of 2.5 nm or less.

The hydrogen generator according to the present invention can generate hydrogen by making contact between the solid catalyst and the reaction substrate(s) and can impede the hydrogen generation by interrupting the contact between the solid catalyst and the reaction substrate(s). This configuration enables flexible control of the progress rate of the reaction (preferably oxidation reaction), and enables hydrogen to be generated at a desired timing. Specifically, the hydrogen generator according to the present invention has an ON/OFF switching function.

The hydrogen generator according to the present invention includes the solid catalyst, and the hydrosilane compound and water, which are reaction substrates. The hydrogen generator is very small-sized and light-weighted as compared with conventional cylinders, in which hydrogen is stored under compression. Also, the hydrogen generator is highly safe and stable. The hydrogen generator is therefore easy to transport. In addition, the hydrogen generator resists deterioration with time, because the hydrosilane compound as the reaction substrate is highly stable.

Fuel Cell

A fuel cell is a device using hydrogen as a fuel to generate electric power by the reaction of the hydrogen with oxygen in the air. The fuel cell according to the present invention includes the hydrogen generator and uses hydrogen generated using the hydrogen generator. More specifically, the fuel cell includes a system to generate (evolve) hydrogen using the method for producing a silanol compound and hydrogen, and uses hydrogen resulting from the system.

The fuel cell according to the present invention, as having the configuration, can be reduced in size and weight. In addition, the fuel cell resists deterioration with time, because each of the components (constituents) of the hydrogen generation system is highly stable. The fuel cell is therefore usable as a portable power source for use in emergency such as disasters.

EXAMPLES

The present invention will be illustrated in further detail with reference to several examples below. It should be noted, however, that the examples are by no means intended to limit the scope of the present invention.

Preparation Example 1 (Solid Catalyst Preparation)

Glutathione (1.0 mmol) was added to 50 mL of a solution of $HAuCl_4$ (0.25 mmol) in methanol, followed by stirring at 0° C. in an air atmosphere for 30 minutes. Next, the reaction mixture was combined with a solution of $KBH_4$ (1.0 mmol) in methanol, followed by stirring at 0° C. for one hour.

Precipitates were isolated from the reaction mixture using a centrifuge and redispersed in water to give a dispersion.

The prepared dispersion was combined with hydroxyapatite (hereinafter also referred to as "HAP", trade name Tricalcium Phosphate, supplied by Wako Pure Chemical Industries, Ltd.; 10 g), followed by stirring at room temperature for 4 hours.

The resulting reaction mixture was filtered to give a filter residue (filter cake), and the filter residue was washed with deionized water, dried in a vacuum, further fired at 400° C. in an air atmosphere for 8 hours to remove glutathione deposited on gold particles, and yielded a solid catalyst (1) (Au/HAP, supported Au amount: 0.5 weight percent). No sulfur component was detected in the solid catalyst (1). This demonstrated that glutathione as a capping agent had been thoroughly removed. The gold particles in the solid catalyst (1) had an average particle size of 1.9 nm, and a standard deviation ($\sigma$) in particle size distribution of 0.16 nm.

Preparation Example 2 (Solid Catalyst Preparation)

A solid catalyst (2) (Au/HAP, supported Au amount: 2.0 weight percent) was prepared by a procedure similar to that in Preparation Example 1, except for adding HAP in an amount of 2.5 g. Gold particles in the solid catalyst (2) had an average particle size of 2.3 nm, and a standard deviation ($\sigma$) in particle size distribution of 0.23 nm.

Preparation Example 3 (Solid Catalyst Preparation)

A solid catalyst (3) (Au/HAP, supported Au amount: 3.0 weight percent) was prepared by a procedure similar to that in Preparation Example 1, except for adding HAP in an amount of 1.67 g. Gold particles in the solid catalyst (3) had an average particle size of 3.1 nm, and a standard deviation ($\sigma$) in particle size distribution of 0.25 nm.

Example 1 (Silanol Compound and Hydrogen Production)

[Chem. 3]

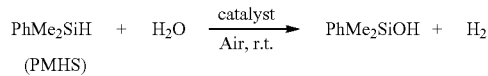

A mixture including dimethylphenylsilane (1 mmol) and water (0.2 mL), as reaction substrates, and dimethyl ether (2 mL) was charged in a reactor, the mixture was combined with the solid catalyst (1) (0.05 mole percent relative to dimethylphenylsilane), then the combined mixture was stirred at 30° C. for 5 minutes with air bubbling, and yielded dimethylphenylsilanol and hydrogen. The yield (%) of dimethylphenylsilanol was measured using a gas chromatograph-mass spectrometer (GC-MS).

The hydrogen generation was immediately stopped when the solid catalyst (1) was removed from the mixture, and the hydrogen generation was immediately restarted when the solid catalyst (1) was immersed again in the mixture.

Example 2 (Silanol Compound and Hydrogen Production)

A procedure similar to that in Example 1 was performed, except for performing the reaction for 9 minutes.

Example 3 (Silanol Compound and Hydrogen Production)

A procedure similar to that in Example 1 was performed, except for using a $5^{th}$ reuse solid catalyst (1) instead of the solid catalyst (1) and performing the reaction for 9 minutes, where the $5^{th}$ reuse solid catalyst (1) was resulted from repeating, a total of five times, an operation of performing a reaction by the procedure of Example 1, recovering the catalyst after the completion of the reaction, and using the recovered catalyst in another reaction.

Example 4 (Silanol Compound and Hydrogen Production)

A procedure similar to that in Example 1 was performed, except for using the solid catalyst (2) instead of the solid catalyst (1).

Comparative Example 1 (Silanol Compound and Hydrogen Production)

A procedure similar to that in Example 1 was performed, except for using the solid catalyst (3) instead of the solid catalyst (1).

Comparative Example 2 (Silanol Compound and Hydrogen Production)

A procedure similar to that in Example 1 was performed, except for using bulk gold instead of the solid catalyst (1).

Comparative Example 3 (Silanol Compound and Hydrogen Production)

A procedure similar to that in Example 1 was performed, except for using HAP instead of the solid catalyst (1).

Results are collectively presented in the following table.

TABLE 1

| | Catalyst | Au average particle size (nm) | Reaction time (min) | Yield (%) |
|---|---|---|---|---|
| Example 1 | Au/HAP (0.5 wt %) | 1.9 | 5 | 83 |
| Example 2 | Au/HAP (0.5 wt %) | 1.9 | 9 | >99 |
| Example 3 | $5^{th}$-reuse Au/HAP (0.5 wt %) | 1.9 | 9 | >99 |
| Example 4 | Au/HAP (2 wt %) | 2.3 | 5 | 49 |
| Comp. Ex. 1 | Au/HAP (3 wt %) | 3.1 | 5 | 39 |
| Comp. Ex. 2 | Au bulk | — | 5 | trace |
| Comp. Ex. 3 | HAP | — | 5 | 0 |

As a summary of the above description, one or more configurations, and variations thereof, according to the present invention will be described below as appendices below:

(1) A method for producing a silanol compound and hydrogen, the method including subjecting a hydrosilane compound and water to a reaction with each other in the presence of a solid catalyst to give a silanol compound and hydrogen, the solid catalyst including hydroxyapatite and gold particles supported on the hydroxyapatite, the gold particles having an average particle size of 2.5 nm or less.

(2) The method according to (1) for producing a silanol compound and hydrogen, in which the solid catalyst has an average particle size of from 0.1 to 50 µm, from 0.1 to 20 µm, or from 0.1 to 0.5 µm, and has a standard deviation (σ) in particle size distribution of from 0.05 to 0.5, or from 0.1 to 0.3.

(3) The method according to one of (1) and (2) for producing a silanol compound and hydrogen, in which the gold particles have an average particle size of 2.5 nm or less, or 2.0 nm or less, with the lower limit being 1.5 nm.

(4) The method according to any one of (1) to (3) for producing a silanol compound and hydrogen, in which the hydroxyapatite has a specific surface area of from 10 to 1000 m²/g, from 50 to 800 m²/g, from 100 to 700 m²/g, from 100 to 500 m²/g, or from 100 to 300 m²/g.

(5) The method according to any one of (1) to (4) for producing a silanol compound and hydrogen, in which the hydroxyapatite has an average particle size of from 0.1 to 50 µm, from 0.1 to 20 µm, or from 0.1 to 0.5 µm.

(6) The method according to any one of (1) to (5) for producing a silanol compound and hydrogen, in which the gold particles are in the form of elemental gold, a gold salt, a gold oxide, a gold hydroxide, or a gold complex.

(7) The method according to any one of (1) to (6) for producing a silanol compound and hydrogen, in which the gold particles are supported in an amount (in terms of metal) of from 0.05 to 10 weight percent, from 0.1 to 5.0 weight percent, from 0.1 or more to 3.0 weight percent, from 0.1 weight percent to less than 2.0 weight percent, from 0.1 to 1.5 weight percent, or from 0.1 to 1.0 weight percent, relative to the hydroxyapatite.

(8) The method according to any one of (1) to (7) for producing a silanol compound and hydrogen, in which the hydroxyapatite is a compound represented by Formula (2):

$$Ca_{10-Z}(HPO_4)_Z(PO_4)_{6-Z}(OH)_{2-Z} \cdot mH_2O \tag{2}$$

wherein Z represents a number meeting the condition: 0≤Z≤1; and m represents a number of 0 to 2.5.

(9) The method according to any one of (1) to (8) for producing a silanol compound and hydrogen, in which the gold particles are supported on the surface of the hydroxyapatite by combining a solution of a gold compound with a reducing agent to precipitate elemental gold, and allowing the surface of the hydroxyapatite to adsorb the precipitated elemental gold.

(10) The method according to (9) for producing a silanol compound and hydrogen, in which the gold compound solution further includes glutathione as a capping agent.

(11) The method according to one of (9) and (10) for producing a silanol compound and hydrogen, in which the reducing agent is selected typically from borohydride complex compounds such as sodium borohydride ($NaBH_4$), lithium borohydride ($LiBH_4$), and potassium borohydride ($KBH_4$); hydrazine; hydrogen ($H_2$); silane compounds such as trimethylsilane; and hydroxy compounds.

(12) The method according to any one of (1) to (11) for producing a silanol compound and hydrogen, in which the hydroxyapatite is used in an amount of 7 g or more, from 7 to 50 g, from 10 to 50 g, or from 10 to 45 g, per millimole of the gold compound.

(13) The method according to any one of (1) to (12) for producing a silanol compound and hydrogen, in which the reaction is performed in an air atmosphere.

(14) The method according to any one of (1) to (13) for producing a silanol compound and hydrogen, in which the reaction is performed with application of substantially no heat and no activated energy rays.

(15) The method according to any one of (1) to (14) for producing a silanol compound and hydrogen, in which the hydrosilane compound is a compound represented by Formula (1).

(16) A hydrogen generator including a system to generate hydrogen using the method according to any one of (1) to (15) for producing a silanol compound and hydrogen.

(17) The hydrogen generator according to (16), including an ON/OFF switching function of making contact between the solid catalyst and the reaction substrate(s) to induce hydrogen generation, and of interrupting the contact between the solid catalyst and the reaction substrate(s) to impede the hydrogen generation.

(18) A fuel cell including the hydrogen generator according to one of (16) and (17).

INDUSTRIAL APPLICABILITY

A hydrosilane compound is a compound which is contained also in industrial waste and is available inexpensively and stably. In addition, the hydrosilane compound is highly safe and stable, is easy to store and to transport, and resists deterioration with time. With the present invention, by using the hydrosilane compound as a hydrogen storage material, hydrogen and a silanol compound can be produced efficiently under mild conditions without the need for external energy. The hydrogen can be easily separated and recovered from reaction products. In addition, the progress rate and ON/OFF of the reaction can be adjusted or controlled by switching the contact state (for example, contact or noncontact) between the solid catalyst and the reaction substrates, and hydrogen and a silanol compound can be produced only in the quantity needed, only when needed.

The hydrogen generator using the present invention having the above properties satisfactorily resists deterioration and can be stored for a long time, as compared with conventional cells and batteries. The hydrogen generator is therefore usable as a portable power source for use in emergency such as disasters. In addition, the hydrogen generator is affordable to reduction in size and weight and is thereby applicable to fuel cells (such as pocket-size fuel cells for use typically in charging of smartphones).

The hydrogen obtained by the present invention is useful as a fuel for fuel cells and can give electric power by burning the hydrogen with air. The hydrogen, even when being burnt, by-produces water alone, but by-produces no carbon dioxide, and the hydrogen is a clean energy, since the carbon dioxide is considered as one of causes of global warming. The present invention therefore significantly contribute to the realization of a low-carbon society that puts a smaller load on global environment.

The invention claimed is:

1. A method for producing a silanol compound and hydrogen, the method comprising:
    subjecting a hydrosilane compound and water to a reaction with each other in the presence of a solid catalyst to give a silanol compound and hydrogen,
    wherein the solid catalyst comprises:
        hydroxyapatite; and
        gold particles supported on the hydroxyapatite, the gold particles having an average particle size of 2.0 nm or less,
    wherein the gold particles are supported on the surface of the hydroxyapatite by combining a solution of a gold compound with a reducing agent to precipitate elemental gold, and allowing the surface of the hydroxyapatite to adsorb the precipitated elemental gold,
    wherein the gold compound solution further comprises glutathione as a capping agent.

2. The method according to claim 1 for producing a silanol compound and hydrogen,
    wherein the reaction is performed in an air atmosphere.

3. The method according to claim 2 for producing a silanol compound and hydrogen,
    wherein the hydrosilane compound is a compound represented by Formula (1):

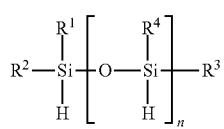

wherein $R^1$ to $R^4$ are each, identically or differently, selected from hydrogen, an optionally substituted hydrocarbon group, and a —$Si(R^5)_3$ group, where $R^5$ is, identically or differently in each occurrence, selected from hydrogen and a hydrocarbon group; and n represents an integer of 0 or more, when n is an integer of 2 or more, two or more occurrences of $R^4$ is identical or different.

4. The method according to claim 2 for producing a silanol compound and hydrogen,
    wherein the gold particles are supported in an amount (in terms of metal) of from 0.05 to 10 weight percent relative to the hydroxyapatite.

5. The method according to claim 2 for producing a silanol compound and hydrogen,
    wherein the reaction is performed without applying heat and activated energy rays.

6. The method according to claim 5 for producing a silanol compound and hydrogen,
    wherein the gold particles are supported in an amount (in terms of metal) of from 0.05 to 10 weight percent relative to the hydroxyapatite.

7. The method according to claim 5 for producing a silanol compound and hydrogen,
    wherein the hydrosilane compound is a compound represented by Formula (1):

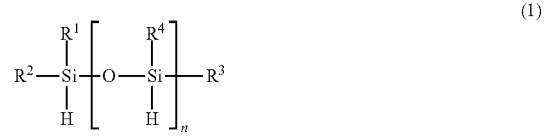

wherein $R^1$ to $R^4$ are each, identically or differently, selected from hydrogen, an optionally substituted hydrocarbon group, and a —$Si(R^5)_3$ group, where $R^5$ is, identically or differently in each occurrence, selected from hydrogen and a hydrocarbon group; and n represents an integer of 0 or more, when n is an integer of 2 or more, two or more occurrences of $R^4$ is identical or different.

8. The method according to claim 7 for producing a silanol compound and hydrogen,
    wherein the gold particles are supported in an amount (in terms of metal) of from 0.05 to 10 weight percent relative to the hydroxyapatite.

9. The method according to claim 1 for producing a silanol compound and hydrogen,
    wherein the reaction is performed without applying heat and activated energy rays.

10. The method according to claim 9 for producing a silanol compound and hydrogen,
    wherein the hydrosilane compound is a compound represented by Formula (1):

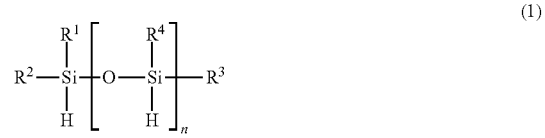

wherein $R^1$ to $R^4$ are each, identically or differently, selected from hydrogen, an optionally substituted, hydrocarbon group, and a —$Si(R^5)_3$ group, where $R^5$ is, identically or differently in each occurrence, selected from hydrogen and a hydrocarbon group; and n represents an integer of 0 or more, when n is an integer of 2 or more, two or more occurrences of $R^4$ is identical or different.

11. The method according to claim 1 for producing a silanol compound and hydrogen,
wherein the hydrosilane compound is a compound represented by Formula (1):

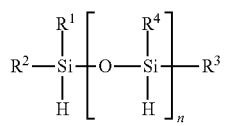

wherein $R^1$ to $R^4$ are each, identically or differently, selected from hydrogen, an optionally substituted hydrocarbon group, and a —$Si(R^5)_3$ group, where $R^5$ is, identically or differently in each occurrence, selected from hydrogen and a hydrocarbon group; and n represents an integer of 0 or more, when n is an integer of 2 or more, two or more occurrences of $R^4$ is identical or different.

12. The method according to claim 1 for producing a silanol compound and hydrogen,
wherein the gold particles axe supported in an amount (in terms of metal) of from 0.05 to 10 weight percent relative to the hydroxyapatite.

13. A hydrogen generator comprising
a batch system, semi-batch system, or continuous system that generates hydrogen using the method according to claim 1 for producing a silanol compound and hydrogen.

14. The hydrogen generator according to claim 13,
wherein the hydrogen generator has an ON/OFF switching function of making contact between the solid catalyst and the hydrosilane compound and water to induce hydrogen generation, and of interrupting the contact between the solid catalyst and the reaction substrates to impede the hydrogen generation.

15. A fuel cell comprising
the hydrogen generator according to claim 13.

* * * * *